US011570061B2

United States Patent
Yu et al.

(10) Patent No.: US 11,570,061 B2
(45) Date of Patent: Jan. 31, 2023

(54) METHOD AND APPARATUS FOR TOPOLOGY DISCOVERY ENABLED INTRUSION DETECTION

(71) Applicants: Tianqi Yu, London (CA); Xianbin Wang, London (CA)

(72) Inventors: Tianqi Yu, London (CA); Xianbin Wang, London (CA)

(73) Assignee: Picovista Innovation Corp., London (CA)

( * ) Notice: Subject to any disclaimer, the term of this patent is extended or adjusted under 35 U.S.C. 154(b) by 154 days.

(21) Appl. No.: 16/729,357

(22) Filed: Dec. 28, 2019

(65) Prior Publication Data

US 2021/0203568 A1 Jul. 1, 2021

(51) Int. Cl.
   *H04L 45/02* (2022.01)
   *H04L 41/12* (2022.01)
   *H04L 9/40* (2022.01)
   *H04L 41/0803* (2022.01)
   *H04L 41/22* (2022.01)
   *H04L 41/0893* (2022.01)

(52) U.S. Cl.
   CPC ......... *H04L 41/22* (2013.01); *H04L 41/0803* (2013.01); *H04L 41/0893* (2013.01); *H04L 41/12* (2013.01); *H04L 45/02* (2013.01); *H04L 63/20* (2013.01)

(58) Field of Classification Search
   CPC ..... H04L 41/22; H04L 41/0803; H04L 63/20; H04L 41/0893; H04L 45/02; H04L 41/12
   See application file for complete search history.

(56) References Cited

U.S. PATENT DOCUMENTS

| | | | |
|---|---|---|---|
| 9,426,139 B1* | 8/2016 | McClintock | H04L 63/08 |
| 10,270,675 B1* | 4/2019 | Lingen | G06F 11/3051 |
| 2014/0130160 A1* | 5/2014 | Golovanov | H04L 63/1433 726/23 |
| 2019/0132932 A1* | 5/2019 | Klecha | H05B 45/60 |
| 2020/0053169 A1* | 2/2020 | Mani | H04L 61/1511 |
| 2020/0076896 A1* | 3/2020 | Anumala | H04W 4/70 |

* cited by examiner

*Primary Examiner* — Tonia L Dollinger
*Assistant Examiner* — Joseph M Cousins
(74) *Attorney, Agent, or Firm* — SZDC Law P.C.

(57) ABSTRACT

The present invention discloses the method and apparatus for topology discovery enabled intrusion detection. In information and communications technology (ICT) systems, end devices are organized into subnets that are communicated with the system center through the multi-service gateways. Any intrusion can incur the variations of the communications environments and the subnet topologies. The potential external intruding devices are detected by the varied communications environments and identified by the difference between the original and new subnet topologies constructed by the topology discovery method. The information of potential external intruding devices is sent to the system center for device authentication. If passed, the device is kept associated and the system topology is updated with the newly discovered subnet topology. If failed, the device is enforced to disassociate, and an enhanced secure mode is triggered where the messages communicated over the intruded subnet are encrypted.

3 Claims, 7 Drawing Sheets

METHOD AND APPARATUS FOR TOPOLOGY DISCOVERY ENABLED INTRUSION DETECTION

TECHNICAL FIELD

The present invention relates to a topology discovery enabled intrusion detection method in hierarchical information and communications technology (ICT) systems with networked end devices, where a hierarchical ICT system comprises layered networks, multi-service gateways, and one or more system data and control centers.

TECHNICAL BACKGROUND

Network intrusion by external devices has become one of the most critical challenges on the security and privacy protection in complex ICT systems consisting of hierarchical subnets. Each subnet maintains its own access control and security provision, which features extremely low intrusion detection capability. On the other hand, the ICT system is often designed with additional security and authentication mechanisms and operated for supporting specific applications and goals, for instance, smart buildings, intelligent transportation systems.

An external device could intrude a subnet first and then intrude the ICT system by eavesdropping the communications within the subnet and the data exchange between the subnet and the ICT system data and control center. The external intruding devices can perform attacks to the ICT systems with severe consequences through messages spoofing, dropping, tampering, flooding, replaying, and eavesdropping. The malicious attacks can finally expose the private messages of the ICT systems to the adversaries. The malicious attacks can also drain the system resources with excess messages and mislead the systems with tampered messages. Therefore, the detection of external intruding devices at the subnets is of great importance in securing complex ICT networks, particularly due to the proliferation of low-end Internet-of-Things (IoT) devices, which are extremely susceptible to identification theft, spoofing, and impersonation. Consequently, the present invention, topology discovery enabled intrusion detection method, is critical for the hierarchical and complex ICT systems. By exploitation of the disclosed method, the external intruding devices can be detected and identified reliably and timely when they gain unauthorized access to the ICT systems.

System Architecture and Components of Hierarchical ICT Systems

A typical hierarchical ICT system is shown in FIG. 1, which comprises: 1) subnet tier 103, which consists of subnets 106 organized by networked end devices 107; 2) gateway tier 102, which is formed up by multi-service gateways 105; 3) system center tier 101, which comprises one or more ICT system data and control centers 104. Particularly, the end devices 107 are in low mobility, which rarely move after the initial deployment stage of the ICT systems. The hierarchical ICT system in FIG. 1 is a generalized system architecture, which can be used to represent homogeneous networks, heterogeneous networks, hybrid/mixed communications networks, computing systems, and vertical industry application systems.

In a hierarchical ICT system, the subnet tier 103 comprises several subnets 106, which are self-organized or manually organized by the end devices 107 through wireless or wired connections. In addition to their inherent communication capabilities, these end devices could have additional capabilities in supporting a wide variety of applications for sensing, controlling, and actuating purposes. An embodiment of the structure of an end device 107 is illustrated in FIG. 2, which consists of the following units: a sensor/actuator unit 201, a processor unit 202, a communications unit 203, and a power unit 204.

In the sensor/actuator unit 201, the sensors 205 are responsible for sensing and collecting the information of the monitoring targets and/or environments. The selection of sensors 205 is determined by the requirements of applications. For example, temperature sensors, humidity sensors, and carbon dioxide titer sensors are among the most typically used sensors for forest fire monitoring. The actuators 206 are responsible for reacting to the feedback from the system center. The selection of actuators 206 is also determined by the requirements of applications. For example, fans and heaters are commonly used for an indoor temperature control system. In terms of the sensor/actuator unit 201, the analog-to-digital converter (ADC) module 207 is optional, which is used to convert the analog signals collected from analog sensors into digital signals to match the digital ICT systems.

The processor unit 202 is built with a microprocessor or microcontroller 208 and a memory 209, which is used to control and coordinate the multiple units in the end device 107 and conduct basic calculations. Memory 209 is used to store both fundamental system instructions and a small amount of sensing data.

The specific type of communications interface 210 embedded in the communications unit 203 is determined by the communications protocol adopted by the end device and its belonging subnet according to the practical demands. For a wireless end device 107, the communications unit 203 is the wireless RF module. The communications protocols adopted by the communications interface 210 can be LTE, NB-IoT, Wi-Fi, Bluetooth, LoRa, ZigBee, etc. While for a wired end device 107, a wired communications interface 210 would be built in the communications unit 203, such as a USB interface, a JTAG interface, and an Ethernet interface.

The multi-service gateways 105 are built with multiple communications interfaces, which can directly communicate with both the end devices 107 and the ICT system data and control center 104. As the intermediate layer in the hierarchical ICT systems, the multi-service gateways 105 have the following functions: 1) as a relay, uploading the messages from end devices 107 to the ICT system data and control center 104 and forward the returning commands from the ICT system data and control center 104 to the end devices 107; 2) as a coordinator, cooperating and coordinating the connected subnets 106 and end devices 107; 3) as an executor, reacting to the control commands and instructions from the ICT system data and control center 104. Furthermore, the multi-service gateways 105 can communicate with each other in a peer-to-peer way and form up the interconnected gateway tier 102.

ICT system data and control center 104 consists of one or multiple servers, which have strong capabilities of computation and storage. As a data center, it takes the responsibility of comprehensive data analytics and massive data storage. As a control center, it is responsible for making decisions based on the data analytics and sending control commands back to manage the multi-service gateways 105 or actuate the end devices 107 through the multi-service gateways 105. The ICT system data and control center 104 has a global view of the entire ICT system, which can be utilized for centralized device authentication. In the initial deployment stage, all the multi-service gateways 105 and end devices 107 involved in the ICT system are authenticated by the ICT system data and control center 104.

The term "topology" refers to the connectivity status among the networked devices including end devices and gateways. In a hierarchical ICT system in FIG. 1, system topology comprises the topology of the gateway tier 102 and the topologies of all the subnets 106. In the initial deployment stage, the end devices 107 are organized into subnets 106. Each subnet 106 is associated with a multi-service gateway 105. The system topology is constructed at the ICT system data and control center 104 by using the hierarchical topology initial discovery method, which is a process to find out the connectivity status among all the devices in the system.

Network intrusion by external devices in this disclosure refers to the situation that certain devices that are not belonging to an ICT system gain the network access to a subnet and associated resources and privileges in an unauthorized way. Due to the openness and weak security protection at subnets, an intruding device can often easily gain access to the subnets. By eavesdropping the communications within the subnets and data exchange between the subnets and the ICT system data and control center, such intruding device can even further intrude the ICT system. Since the activities conducted by the external intruding devices can hardly be detected, predicted, and controlled by the subnets, the external intruding devices and the corresponding activities can lead to extremely high risks to the ICT systems on security and privacy protection.

The external intruding devices can perform attacks to the ICT systems with severe consequences through messages spoofing, dropping, tampering, flooding, replaying, and eavesdropping. More specifically, 1) spoofing: send forged messages to mislead the authenticated devices with fake information; 2) dropping: knock off the communicated messages between authenticated devices in the ICT systems; 3) tampering: monitor and modify the messages in the middle of authorized communications; 4) flooding: send a massive amount of forged messages to drain the system resources and block the authorized communications; 5) replaying: repeatedly send the messages obtained through eavesdropping to mislead the devices with authorized messages; and 6) eavesdropping: illegally hear and monitor the communicated messages between authenticated devices in the ICT systems.

The malicious attacks conducted by the external intruding devices can finally lead to the following potential security and privacy consequences in the ICT systems: 1) private messages exposure incurred by illegally eavesdropping; 2) no reactions from authenticated devices to authorized control commands due to message dropping; 3) misbehaviors of authenticated devices led by forged or modified or repeated messages; 4) system resource-draining due to message flooding.

In order to perform the network intrusion related attacks, an external intruding device often has to join the ICT system through unauthorized association with an authenticated device. As a consequence, the external intruding devices would make an impact on the structure of the intruded ICT system and result in its topology variation. Therefore, based on the topology variation incurred by the external device intrusion, the external intruding devices can be identified by the disclosed topology discovery enabled intrusion detection method.

BRIEF SUMMARY OF THE INVENTION

The current invention is on the topology discovery enabled intrusion detection method for the hierarchical ICT systems, where the external intruding devices are identified based on the difference between the network topologies discovered before and after the intrusion occurs. Specifically, the external device intrusion can lead to variations in both the physical communications environments and the system topology. If any variation on the physical communications environments in a certain subnet 106 is detected by its connected multi-service gateway 105, a new round of subnet topology discovery is triggered, where the attributes used to detect the variation on the physical communications environments are determined by the wireless or wired communication protocols adopted in the specific ICT systems. The potential external intruding devices are then identified based on the variations between the original topology and the newly discovered topology. The information of the identified potential external intruding devices is sent to the ICT system data and control center 104 for centralized device authentication. If a potential external intruding device passes the authentication, then the potential external intruding device is kept associated with the ICT system. The system topology of the entire ICT system is updated with the newly discovered subnet topology discovered after the intrusion occurs. If a potential external intruding device fails to pass the authentication, then it is considered as an external intruding device, which is enforced to disassociate with the system and an enhanced secure more is triggered. In the enhanced secure mode, all the messages communicated in the intruded subnet are encrypted by the asymmetric cryptography.

BRIEF DESCRIPTION OF THE DRAWINGS

To make the present invention better understood, and the features and advantages of the invention more apparent, a description of the accompanying drawings will be given.

DETAILED DESCRIPTION OF THE INVENTION

Figure 1:
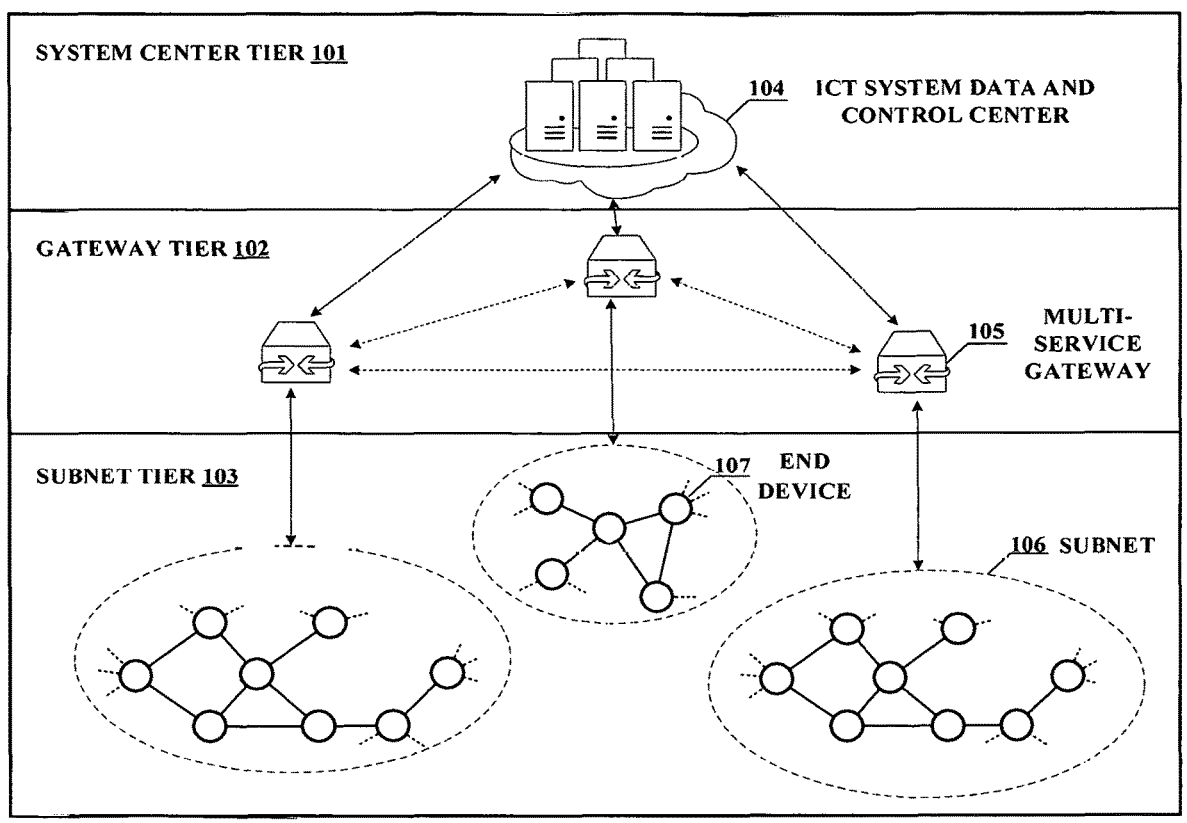
FIG. 1 is a system diagram illustrating a general three-tier hierarchical ICT system, which consists of a system center tier 101 with a centralized ICT system data and control center 104, a gateway tier 102 with several distributed and interconnected multi-service gateways 105, and a subnet tier 103 with a massive amount of heterogeneous subnets 106 that are organized by static end devices 107.
Figure 2:
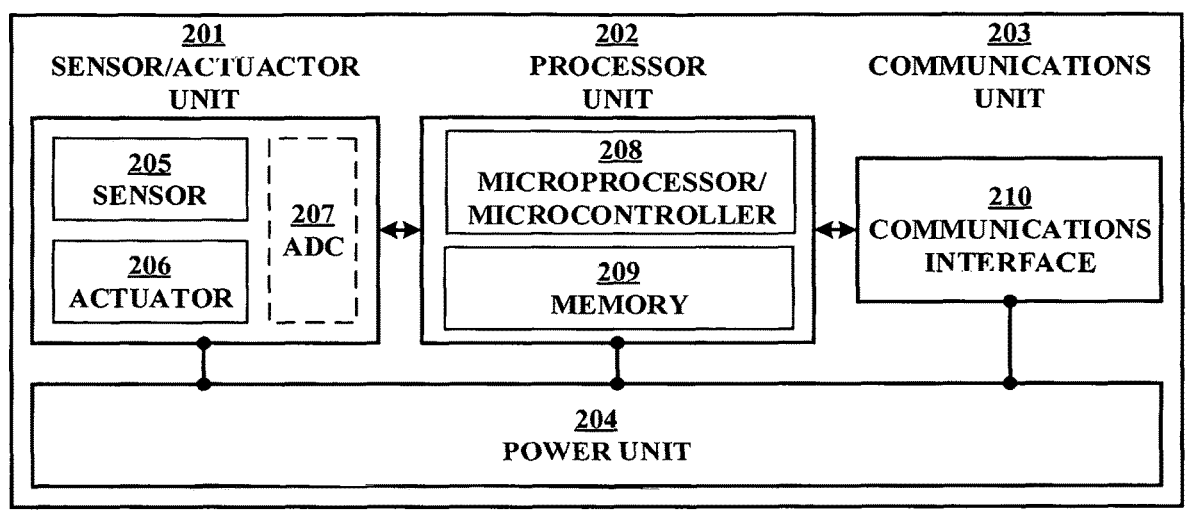
FIG. 2 is a block diagram illustrating the general structure of an end device 107 in the ICT systems, which comprises a sensor/actuator unit 201, a processor unit 202, a communication unit 203, and a power unit 204.

In the initial deployment stage, end devices 107 are organized into subnets 106. The way of subnet organization is determined by either a wired or wireless communication protocol adopted. For example, in the ZigBee protocol, a device indicates its existence by broadcasting beacon signals, which comprise the device information. Any other devices within the wireless communication range can hear the beacon signals and determine whether to build the connection. If a device within the range determines to connect with the beacon sender, it would send the connection request to the beacon sender. If the beacon sender agrees to connect, it would send back a connection response. After receiving the connection response, the requester would send an acknowledgment. These two devices then build a wireless communication link and add each other to the local neighbor tables. A local neighbor table is a list locally stored that consists of the directly connected devices. The ZigBee subnets are finally formed up through the connected end devices.

A multi-service gateway 105 that passes the centralized authentication at the ICT system data and control center 104 is assigned to a subnet 106 for relaying the communications between the subnet and the ICT system data and control center 104. The end devices 107 in the subnet communicate with the corresponding multi-service gateway through single or multiple hops. The multi-service gateways 105 are interconnected to form up the gateway tier 102 through either wireless or wired links. The information of the end devices 107 is sent to the ICT system data and control center 104 for centralized authentication through their connected multi-service gateways 105. Only the end devices 107 that pass the authentication can be kept in the ICT system. The authenticated end devices 107 are assigned with a pair of public and private keys by their connected multi-service gateways 105 for encrypted communications in the secure mode. The end devices 107 that fail to pass the authentication are enforced to disassociate with the ICT system.

System topology of a hierarchical ICT system illustrated in FIG. 1 comprises both the topology of the gateway tier 102 and the topologies of all the subnets 106 in the subnet tier 103. Topology discovery is the procedure of constructing the system topology at the ICT system data and control center 104. At the ICT system data and control center 104, the multi-service gateways 105 are denoted as G=[$g_1$, $g_2$, ..., $g_k$] and the total number of gateways is k denoted as k=|G|. The n end devices 107 are denoted as E=[$e_1$, $e_2$, ..., $e_n$] and |E|=n. The system topology is represented by logical adjacency matrix C. Logical adjacency matrix C is a binary matrix, where "1" indicates the existence of a valid communication link between two devices (either multi-service gateways 105 or end devices 107) no matter whether they are wirelessly or wired connected. By contrast, "0" indicates the disconnected status. For any two devices u and v, $$C_{u,v} = \begin{cases} 1, & \text{if } (u, v) \text{ exists,} \\ 0, & \text{otherwise} \end{cases}.$$

where (u, v) refers to the valid communication link between devices u and v.

Methodology of Topology Discovery Enabled Intrusion Detection

Figure 3:
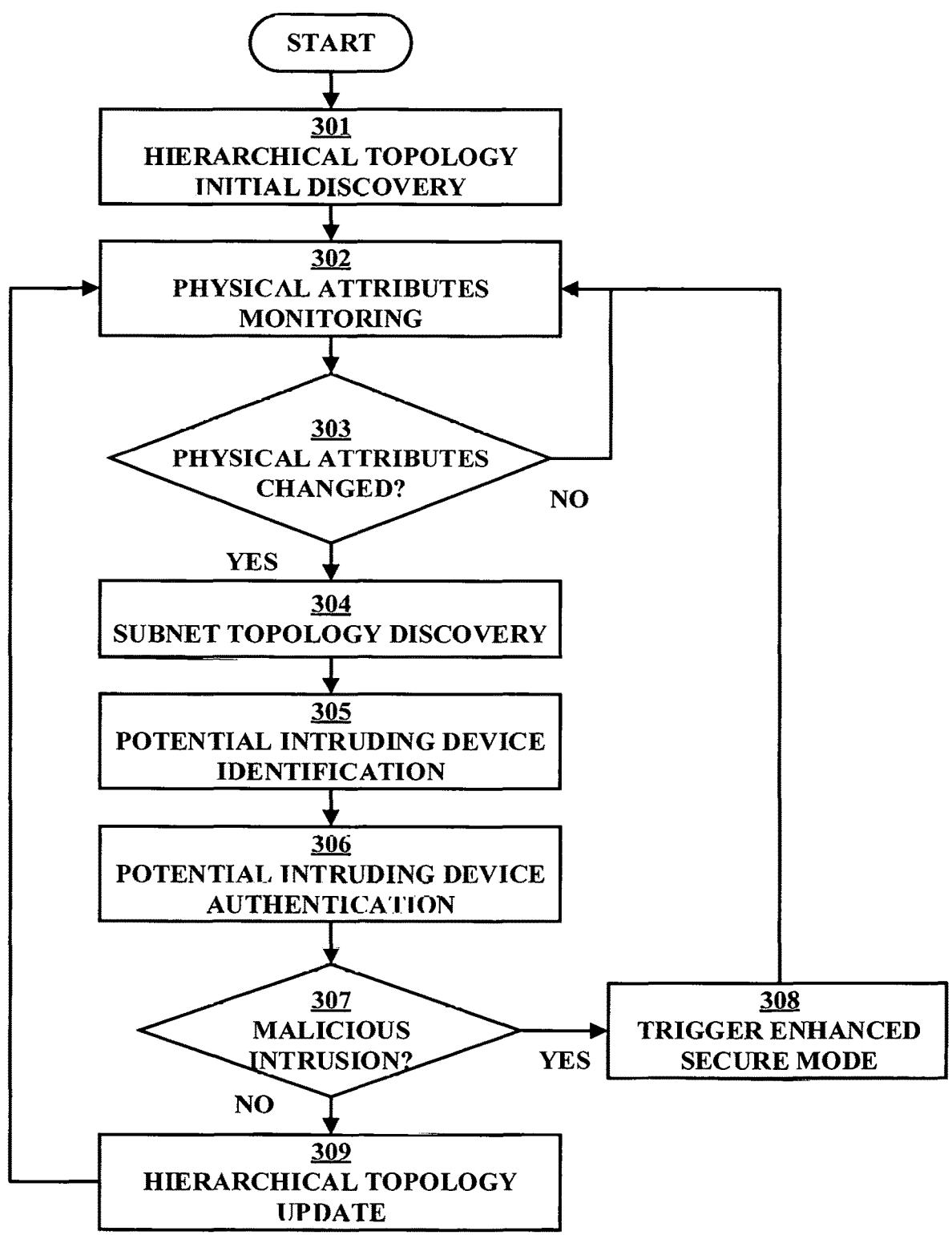
FIG. 3 is a flow diagram illustrating the example operations for the invented topology discovery enabled intrusion detection mechanism.

The methodology flowchart of the invented topology discovery enabled intrusion detection mechanism is demonstrated in FIG. 3. At block 301, the hierarchical topology initial discovery method is executed to construct the system topology at the ICT system data and control center 104 after the initial deployment stage, where the system topology of a hierarchical ICT system comprises the topology of gateway tier 102 and the topologies of all the subnets 106 in the subnet tier 103.

Figure 4:
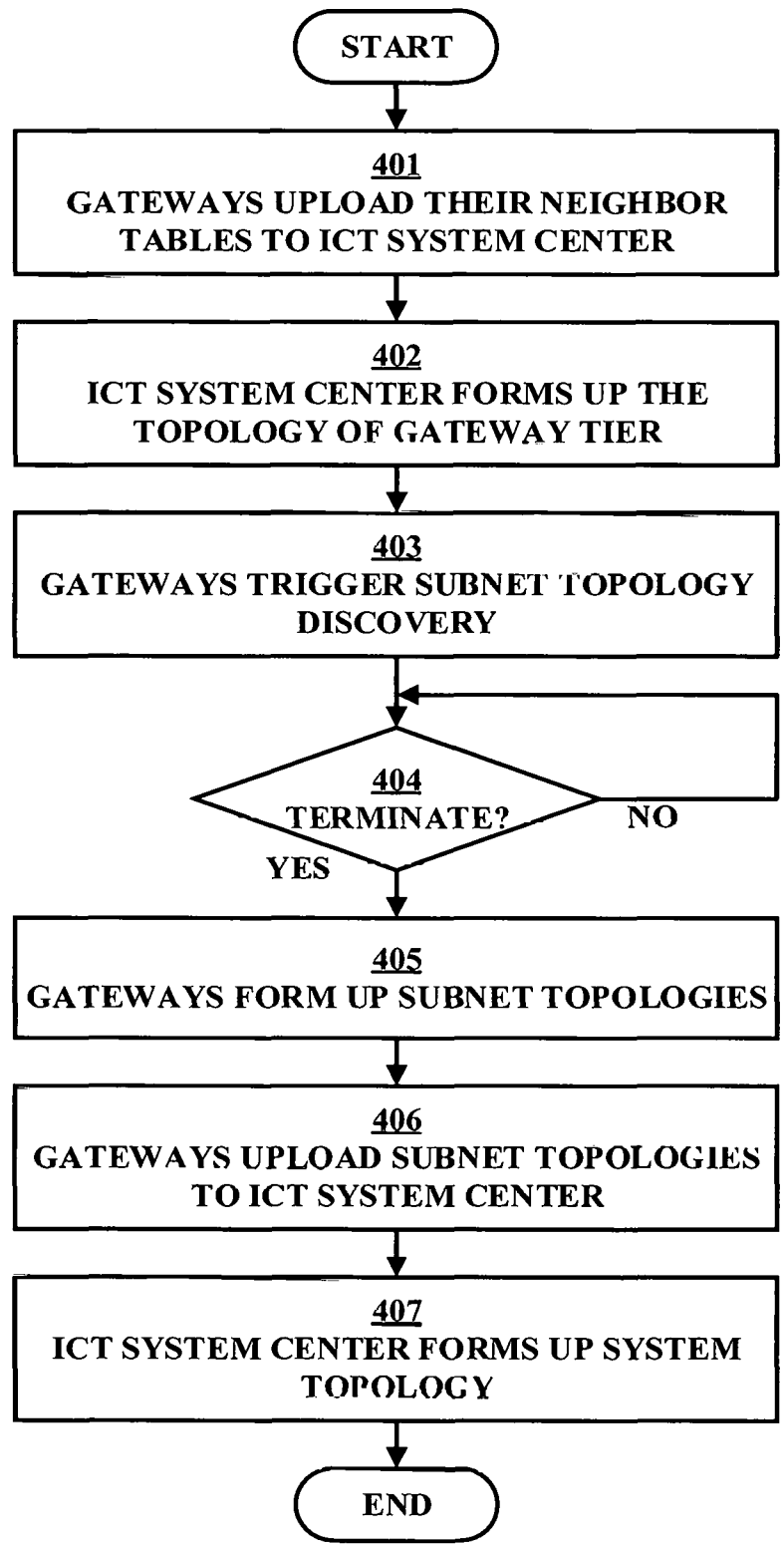
FIG. 4 illustrates the example operations for the hierarchical topology initial discovery method.

FIG. 4 is the flow diagram of the hierarchical topology initial discovery method. The multi-service gateways 105 report their local neighbor tables to the ICT system data and control center 104 at block 401. At block 402, the ICT system data and control center 104 builds the topology of the gateway tier 102 in the format of a logical adjacency matrix $C_G$ based on the connectivity information stated in the local neighbor tables.

Figure 5:
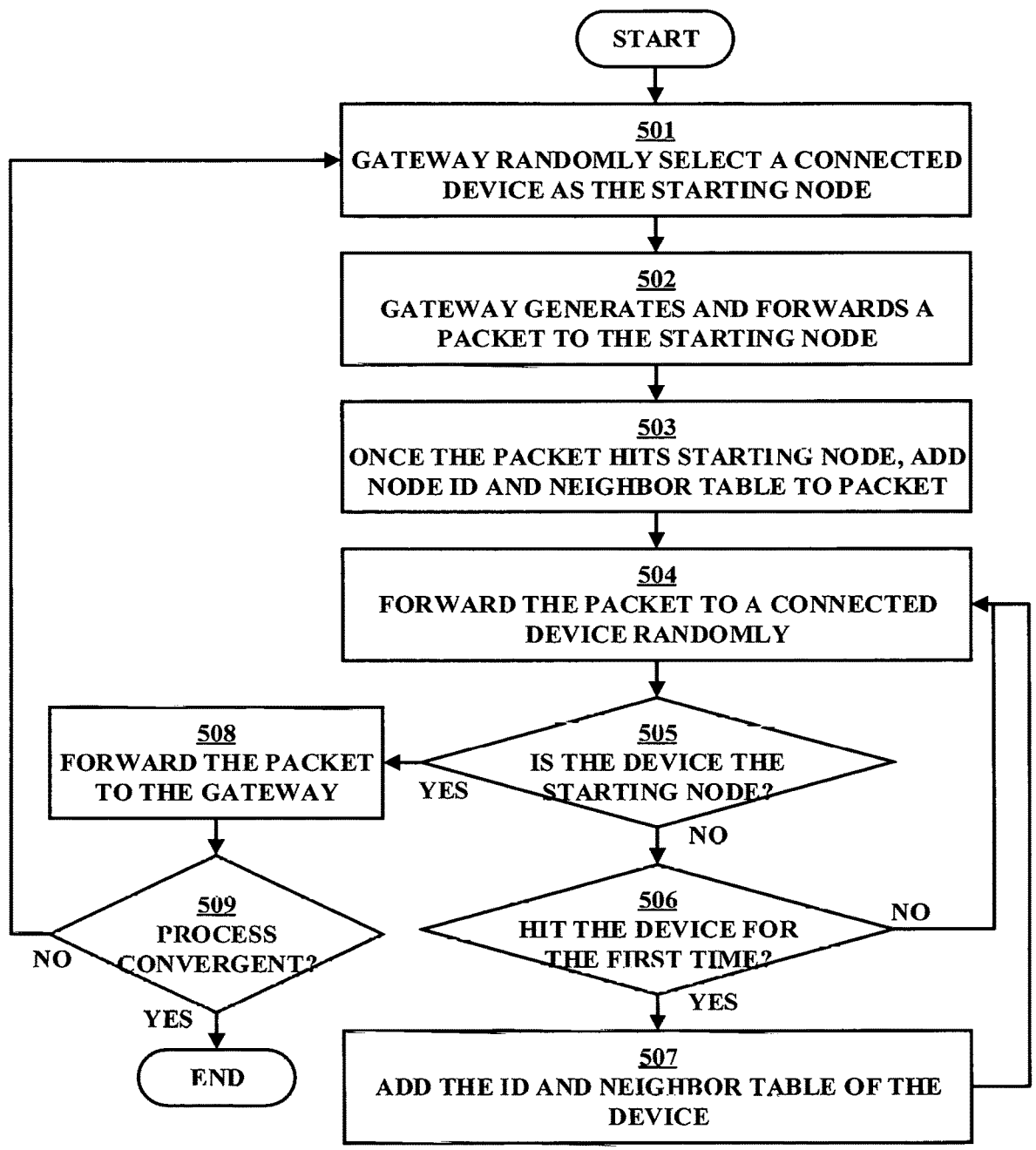
FIG. 5 illustrates the example operations for the subnet topology discovery method.

At block 403, the subnet topology discovery method is executed at each of the multi-service gateways 105 to build the topology of its connected subnets. The flow diagram of the subnet topology discovery method is illustrated in FIG. 5. At block 501, a multi-service gateway 105 randomly selects one of its directly connected end devices 107 as the starting device. The multi-service gateway 105 then generates a packet and forwards the packet to the starting device for information collection at block 502. At block 503, when the starting node receives the packet, it adds its device ID and local neighbor table to the packet.

One of the directly connected end devices 107 is randomly selected as the next-hop device with the equal probability $1/d_{e_i}$ at block 504, where $d_{e_i}$ is the number of directly connected end devices of device $e_i$, termed as device degree. At block 505, it determines whether the next-hop end device is the starting device. If the next-hop end device is not the starting device, then it determines whether the next-hop end device is hit for the first time at block 506 by checking whether the device ID is already comprised in the payload of the packet. If the next-hop end device is hit for the first time, its device ID and local neighbor table are added to the packet when the next-hop end device receives the packet at block 507. Afterwards, the packet is forwarded at block 504. If the next-hop end device is not hit for the first time, then the packet is directly forwarded at block 504. At block 505, if the next-hop device is determined as the starting device, then the packet is reported to the multi-service gateway 105 by the starting device at block 508. The multi-service gateway 105 determines whether the process of subnet topology discovery is convergent at block 509 by checking whether the number of hitting device is stable for half of the packet returning times. If the process of subnet topology discovery is not convergent, a new starting device is selected, and a new round of subnet topology discovery is triggered at block 501. If convergent, the process of subnet topology discovery terminates.

At block 404, a multi-service gateway 105 determines whether the process of subnet topology discovery terminates. If the process terminates, the subnet topology is constructed at the gateway in the format of a logical adjacency matrix based on the collected device IDs and neighbor tables at block 405. The gateways then report the constructed subnet topologies to the ICT system data and control center 104 at block 406. At block 407, the system topology is finally formed up at the ICT system data and control center 104 based on the topology of gateway tier 102 constructed at block 402 and the topologies of subnets received from the multi-service gateways 105 at block 406.

After the hierarchical topology initial discovery method terminates, the physical attributes of communications in the subnets 106 are monitored by the multi-service gateways at block 302. The physical attributes of communications used are determined by the specific communication protocols adopted in the subnets 106. For example, for wireless communication subnets, signal-to-interference-plus-noise ratio (SINR) is used, since the external device intrusion can incur variations on the communications interference. For wired communication subnets, the number of messages communicated within a given period can be recorded to detect the intrusion, since external device intrusion can incur the frequency change of the message communications.

At block 303, a multi-service gateway 105 determines whether any attribute in its connected subnet is changed. If the variation of any attribute is beyond a certain threshold, the subnet topology discovery is triggered within the subnet at block 304 to construct the new logical adjacency matrix, where the thresholds are determined by the practical applications and obtained through multiple times of testing in the initial deployment stage.

Figure 6:
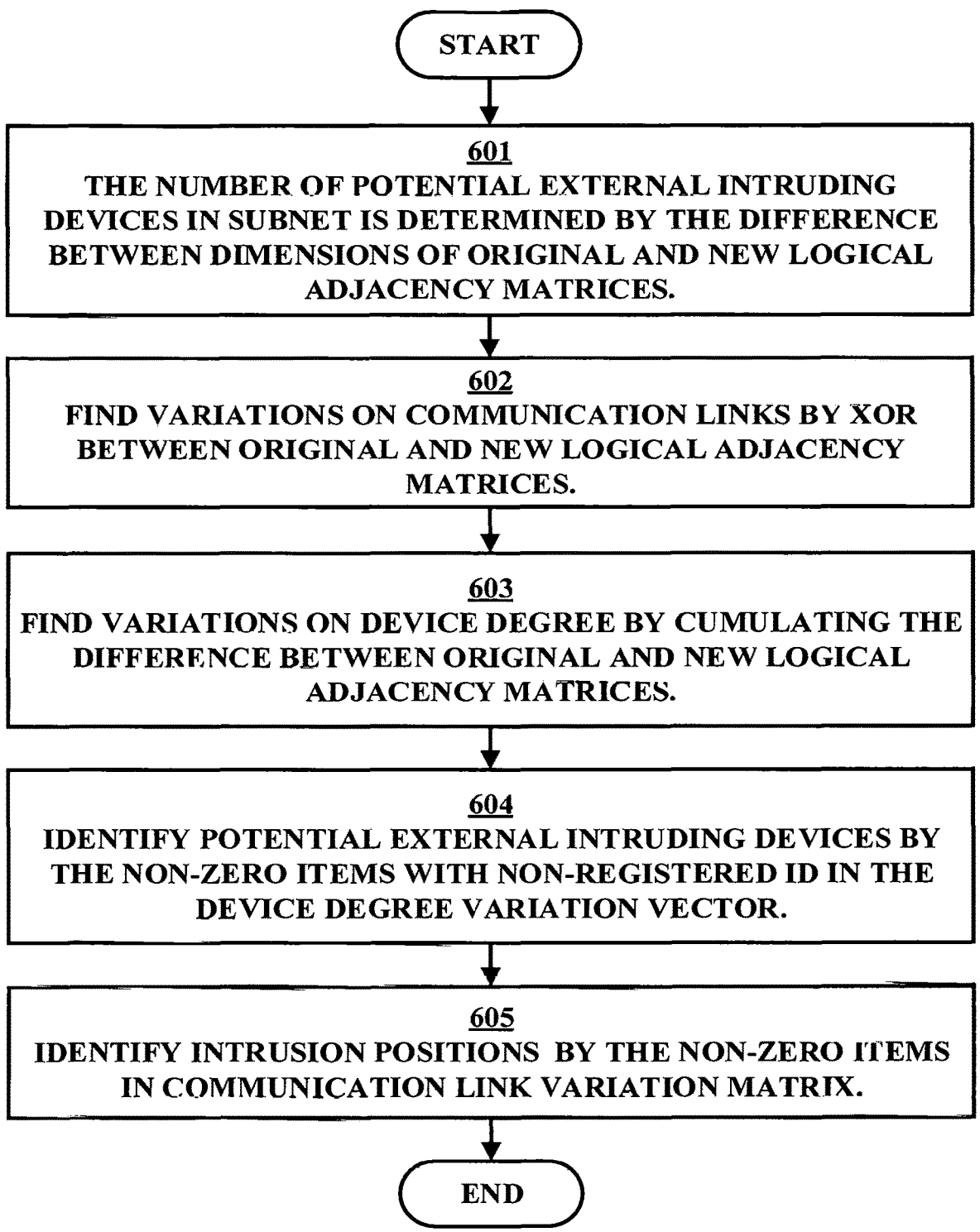
FIG. 6 is an example sequence diagram for the external intruding device identification method executed at the gateway.

The potential external intruding devices are identified by the potential external intruding device identification method at block 305. The logical adjacency matrices of the original subnet topology and the newly discovered subnet topology are denoted as $C_{sub}$ and $C_{sub}'$. In the potential external intruding device identification method as illustrated in the flow diagram FIG. 6, the number of potential external intruding devices in the subnet is determined by (n'−n) at block 601, where n' and n are the dimensions of $C_{sub}'$ and $C_{sub}$ respectively. At block 602, the variations on communication links are discerned by the exclusive or between the logical adjacency matrix of the original subnet topology and the logical adjacency matrix of the newly discovered subnet topology, $XE=C_{sub}' \oplus C_{sub}$. At block 603, the variations on device degree are recognized by cumulating the difference between the logical adjacency matrix of the original subnet topology and the logical adjacency matrix of the newly discovered subnet topology, $XV_i = \Sigma_{j=1}^{n'}(C_{sub_{ij}}' - C_{sub_{ij}})$. Finally, the devices with both non-zero values in the device degree variation vector XV and non-registered IDs are identified as potential external intruding devices at block 604. The intrusion positions of potential external intruding devices can be identified by the non-zero items in the communication link variation matrix XE at block 605.

At block 306, the multi-service gateway 105 reports the potential external intruding devices to the ICT system data and control center 104 for centralized device authentication. At block 307, the ICT system data and control center 104 determines whether the potential external intruding devices are true external intruding devices or trusted devices. If a potential external intruding device passes the authentication and labeled as a trusted device, the ICT system data and control center 104 sends the authentication to the multi-service gateway 105 to keep the device associated with the subnet, and the multi-service gateway 105 uploads the newly discovered subnet topology to the ICT system data and control center 104 to update the system topology at block 309. The multi-service gateway 105 continues to monitor the physical attributes of communications in its connected subnet at block 301. If a potential external intruding device fails to pass the authentication, the ICT system data and control center 104 sends control commands and instructions to the multi-service gateway 105 to enforce the disassociation of the true external intruding device and trigger the enhanced secure mode.

In the enhanced secure mode, all the messages communicated over the intruded subnet are protected by the asymmetric cryptography. In the initial deployment stage, all the end devices 107 in the subnet are assigned with a pair of public and private keys by the connected multi-service gateway 105. When the enhanced secure mode is triggered, the messages are encrypted by the sending devices with their private keys. The messages are decrypted at the receiving devices with the public key. The operations of encryption and decryption consume extra system resources. Thus, the enhanced secure mode is triggered only when the intrusion occurs, which sacrifices the system resources for security. The multi-service gateway 105 continues to monitor the physical attributes of communications in its connected subnets at block 301.

Embodiment—Topology Discovery Enabled Intrusion Detection in the Smart Building Systems In the smart building systems, wireless sensor nodes and wireless actuator nodes are deployed in fixed locations of the buildings for monitoring and adjusting the indoor environments, including temperature, humidity, and illumination. These nodes access to the core network through smart wireless gateways. Cloud computing platform supported by cloud servers is utilized as the remote system data and control center. Smart wireless gateways are connected to the cloud computing platform through cables.

Sensing and control data are communicated within the smart building systems. External device intrusion can lead to the exposure of private user information and daily behaviors of residents in the buildings to adversaries. The malicious attackers can also utilize external device intrusion to forge and tamper control commands to mislead the actuator nodes in the buildings. Thus, the application of the topology discovery enabled intrusion detection method can improve the security and privacy of the smart building systems.

In the initial deployment stage, only the authenticated devices are deployed in a smart building system. The devices are self-organized into wireless sensor and actuator networks and connect to the smart wireless gateways with the best link quality. These devices are assigned with a pair of public and private keys by their connected smart wireless gateways for encrypted communications in the enhanced secure mode. The hierarchical topology initial discovery method is executed to construct the topology of the smart building system in the cloud computing platform.

Since the wireless sensor nodes and wireless actuator nodes are deployed in fixed locations with low mobility, the wireless communication environments tend to be stable. The smart wireless gateways keep monitoring the attributes of the wireless communications environments, including signal-to-interference-plus-noise ratio (SINR), link quality indicator (LQI), and channel frequency offset (CFO). If the variation of any attribute is beyond a threshold, the subnet topology discovery method is triggered, where the thresholds are determined by the practical applications and obtained through multiple times of testing in the initial deployment stage.

After the completion of subnet topology discovery, the potential external intruding devices can be identified by the potential external intruding device identification method based on the logical adjacency matrix of the original subnet topology and the logical adjacency matrix of the newly discovered subnet topology. The smart wireless gateway forwards the information of the identified potential external intruding devices to the cloud computing platform for centralized device authentication.

If a potential external intruding device is identified as a true external intruding device, the cloud computing platform would send a control command to the corresponding smart wireless gateway to enforce the disassociation of the external intruding device and trigger the enhanced secure mode. In the enhanced secure mode, all the communicated messages are protected by the asymmetric cryptography. The messages are encrypted by the sending devices with their private keys. The messages are decrypted at the receiving devices with the public key.

If an external intruding device is authenticated as a trusted device, the cloud computing platform would send a control command to the smart wireless gateway, comprising the content of keeping the device associated with the system and sending a request for the newly discovered subnet topology. The smart wireless gateway reports the new subnet topology to the cloud computing platform. In the cloud computing platform, the system topology would be updated. The updated system topology is then multicast to all the smart wireless gateways in the ICT system.

Figure 7:
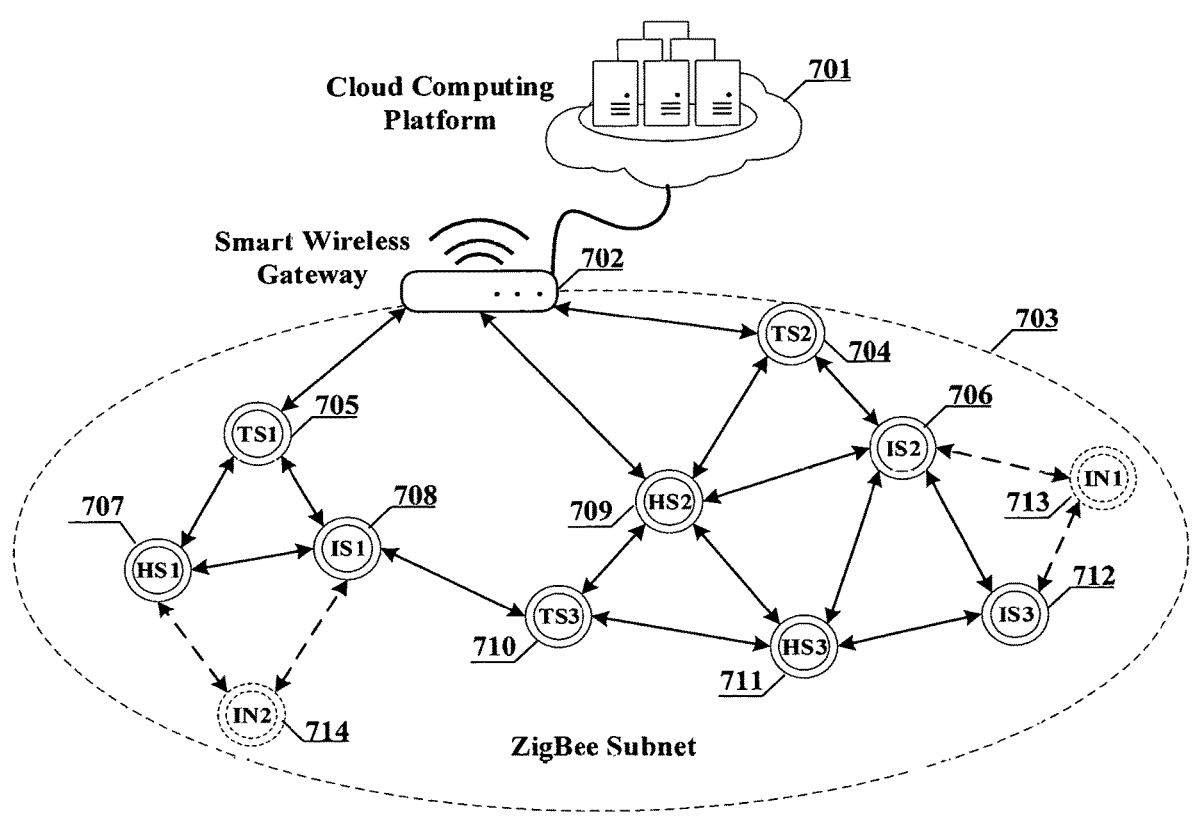
FIG. 7 is a diagram illustrating an example case of a ZigBee subnet in a smart building system with two external intruding devices.

FIG. 7 illustrates an example case of a ZigBee subnet 703 in the smart building system with two external intruding devices (IN1 713 and IN2 714). In the ZigBee subnet 703, there are three temperature sensors (TS1 705, TS2 704, and TS3 710), three humidity sensors (HS1 707, HS2 709, and HS3 711) and three illumination sensors (IS1 708, IS2 706, and IS3 712). The ZigBee subnet 703 is connected to the cloud computing platform 701 through the smart wireless gateway 702. The binary logical adjacency matrix of the ZigBee subnet 703 is demonstrated in Table 1.

Logical Adjacency Matrix of the ZigBee Subnet before Intrusion

|     | TS1 | TS2 | TS3 | HS1 | HS2 | HS3 | IS1 | IS2 | IS3 |
| --- | --- | --- | --- | --- | --- | --- | --- | --- | --- |
| TS1 | 0 | 0 | 0 | 1 | 0 | 0 | 1 | 0 | 0 |
| TS2 | 0 | 0 | 0 | 0 | 1 | 0 | 0 | 1 | 0 |
| TS3 | 0 | 0 | 0 | 0 | 1 | 1 | 1 | 0 | 0 |
| HS1 | 1 | 0 | 0 | 0 | 0 | 0 | 1 | 0 | 0 |
| HS2 | 0 | 1 | 1 | 0 | 0 | 1 | 0 | 1 | 0 |
| HS3 | 0 | 0 | 1 | 0 | 1 | 0 | 0 | 1 | 1 |
| IS1 | 1 | 0 | 1 | 1 | 0 | 0 | 0 | 0 | 0 |
| IS2 | 0 | 1 | 0 | 0 | 1 | 1 | 0 | 0 | 1 |
| IS3 | 0 | 0 | 0 | 0 | 0 | 1 | 0 | 1 | 0 |

After the intrusion occurs, the logical adjacency matrix of the newly discovered subnet topology of the ZigBee subnet is illustrated in Table 2.

TABLE 2

Logical Adjacency Matrix of the ZigBee Subnet after Intrusion

|     | TS1 | TS2 | TS3 | HS1 | HS2 | HS3 | IS1 | IS2 | IS3 | IN1 | IN2 |
| --- | --- | --- | --- | --- | --- | --- | --- | --- | --- | --- | --- |
| TS1 | 0 | 0 | 0 | 1 | 0 | 0 | 1 | 0 | 0 | 0 | 0 |
| TS2 | 0 | 0 | 0 | 0 | 1 | 0 | 0 | 1 | 0 | 0 | 0 |
| TS3 | 0 | 0 | 0 | 0 | 1 | 1 | 1 | 0 | 0 | 0 | 0 |
| HS1 | 1 | 0 | 0 | 0 | 0 | 0 | 1 | 0 | 0 | 0 | 1 |
| HS2 | 0 | 1 | 1 | 0 | 0 | 1 | 0 | 1 | 0 | 0 | 0 |
| HS3 | 0 | 0 | 1 | 0 | 1 | 0 | 0 | 1 | 1 | 0 | 0 |
| IS1 | 1 | 0 | 1 | 1 | 0 | 0 | 0 | 0 | 0 | 1 | 1 |
| IS2 | 0 | 1 | 0 | 0 | 1 | 1 | 0 | 0 | 1 | 1 | 0 |
| IS3 | 0 | 0 | 0 | 0 | 0 | 1 | 0 | 1 | 0 | 0 | 0 |
| IN1 | 0 | 0 | 0 | 0 | 0 | 0 | 1 | 1 | 0 | 0 | 0 |
| IN2 | 0 | 0 | 0 | 1 | 0 | 0 | 1 | 0 | 0 | 0 | 0 |

The dimension of Table 1 is 9, while the dimension of Table 2 is 11. The number of potential external intruding devices is determined by (n'−n), which is 2 and matches the ground truth. The variations on the device degree are determined by $XV_i = \sum_{j=1}^{n'} (C_{sub_{ij}}' - C_{sub_{ij}})$ and the result is shown in Table 3.

TABLE 3

Device Degree Variation Vector

| TS1 | TS2 | TS3 | HS1 | HS2 | HS3 | IS1 | IS2 | IS3 | IN1 | IN2 |
| --- | --- | --- | --- | --- | --- | --- | --- | --- | --- | --- |
| 0 | 0 | 0 | 1 | 0 | 0 | 1 | 1 | 1 | 2 | 2 |

The variations on the communication links are decided by $XE = C_{sub}' \oplus C_{sub}$ and the result is given in Table 4.

TABLE 4

Communication Link Variation Matrix

|     | TS1 | TS2 | TS3 | HS1 | HS2 | HS3 | IS1 | IS2 | IS3 | IN1 | IN2 |
| --- | --- | --- | --- | --- | --- | --- | --- | --- | --- | --- | --- |
| TS1 | 0 | 0 | 0 | 0 | 0 | 0 | 0 | 0 | 0 | 0 | 0 |
| TS2 | 0 | 0 | 0 | 0 | 0 | 0 | 0 | 0 | 0 | 0 | 0 |
| TS3 | 0 | 0 | 0 | 0 | 0 | 0 | 0 | 0 | 0 | 0 | 0 |
| HS1 | 0 | 0 | 0 | 0 | 0 | 0 | 0 | 0 | 0 | 0 | 1 |
| HS2 | 0 | 0 | 0 | 0 | 0 | 0 | 0 | 0 | 0 | 0 | 0 |
| HS3 | 0 | 0 | 0 | 0 | 0 | 0 | 0 | 0 | 0 | 0 | 0 |
| IS1 | 0 | 0 | 0 | 0 | 0 | 0 | 0 | 0 | 0 | 0 | 1 |
| IS2 | 0 | 0 | 0 | 0 | 0 | 0 | 0 | 0 | 0 | 1 | 0 |
| IS3 | 0 | 0 | 0 | 0 | 0 | 0 | 0 | 0 | 0 | 0 | 0 |
| IN1 | 0 | 0 | 0 | 0 | 0 | 0 | 0 | 1 | 1 | 0 | 0 |
| IN2 | 0 | 0 | 0 | 1 | 0 | 0 | 1 | 0 | 0 | 0 | 0 |

The devices with the non-zero values and non-registered IDs in the device degree variation vector as indicated in Table 3 are identified as the potential external intruding devices, namely, IN1 713 and IN2 714. The specific intrusion positions are identified by the non-zero items in the communication link variation matrix as given in Table 4, which indicates that IN1 713 is connected with IS2 706 and IS3 712 and IN2 714 is connected with HS1 707 and IS1 708. The result matches the ground truth as demonstrated in FIG. 7.

What is claimed is:

1. A method for detecting a topology discovery enabled intrusion in a hierarchical information and communications technology (ICT) system, the ICT system comprising a system center tier, a gateway tier, and a subnet tier, the system center tier comprising an ICT system data and control center, the gateway tier comprising interconnected multi-service gateways, the subnet tier comprising subnets for supporting end devices, the method comprising:
   executing a hierarchical topology initial discovery method to construct a system topology at the system center tier;
   monitoring physical attributes of communications in all the subnets by the multi-service gateways;
   determining whether any of the physical attributes of communications in the subnets are changed beyond a threshold;
   triggering a subnet topology discovery method at the multi-service gateway when the change of the physical attributes of communications is beyond the threshold;
   executing a potential external intruding device identification method at each of the multi-service gateways based on a subnet topology to identify one or more external intruding device, which causes a subnet topology change and with access to the subnets, wherein the subnet topology is generated from the subnet topology discovery method;

reporting the one or more external intruding devices from the multi-service gateways to the ICT system data and control center for a centralized device authentication;

sending control commands and instructions to the multi-service gateways to enforce a disassociation of the one or more external intruding devices with the subnets and to trigger an enhanced secure mode in the subnets when the one or more external intruding devices fails to pass the centralized device authentication of the ICT system data and control center; or sending the control commands to the multi-service gateways to label the one or more external intruding devices as a trusted device and update the subnet topology at the multi-service gateways;

reporting the subnet topology from the multi-service gateways to the ICT system data and control center;

updating the system topology at the ICT system data and control center with the updated subnet topology uploaded from the multi-service gateway; and multicasting the system topology to the multi-service gateways.

2. The method of claim 1, wherein the physical attributes of communications comprise a signal-to-interference-plus-noise ratio (SINR) for wireless communications and a message density for wired communications.

3. The method of claim 1, wherein the hierarchical topology initial discovery method comprises: reporting a device ID and a local neighbor table from the multi-service gateways to the ICT system data and control center; constructing a gateway tier topology at the ICT system data and control center based on the device ID and a connectivity status stated in the local neighbor table; triggering the subnet topology discovery method by the multi-service gateways; determining whether the subnet topology discovery method is executed at the multi-service gateways; constructing the subnet topology at the multi-service gateways based on the collected device ID and local neighbor table after executing the subnet topology discovery method; reporting the subnet topology from the multi-service gateways to the ICT system data and control center; and constructing the system topology at the ICT system data and control center.

* * * * *